March 2, 1965 L. B. DOUTHIT ETAL 3,171,216
EDUCATIONAL DEVICE
Filed Dec. 18, 1961 3 Sheets-Sheet 3

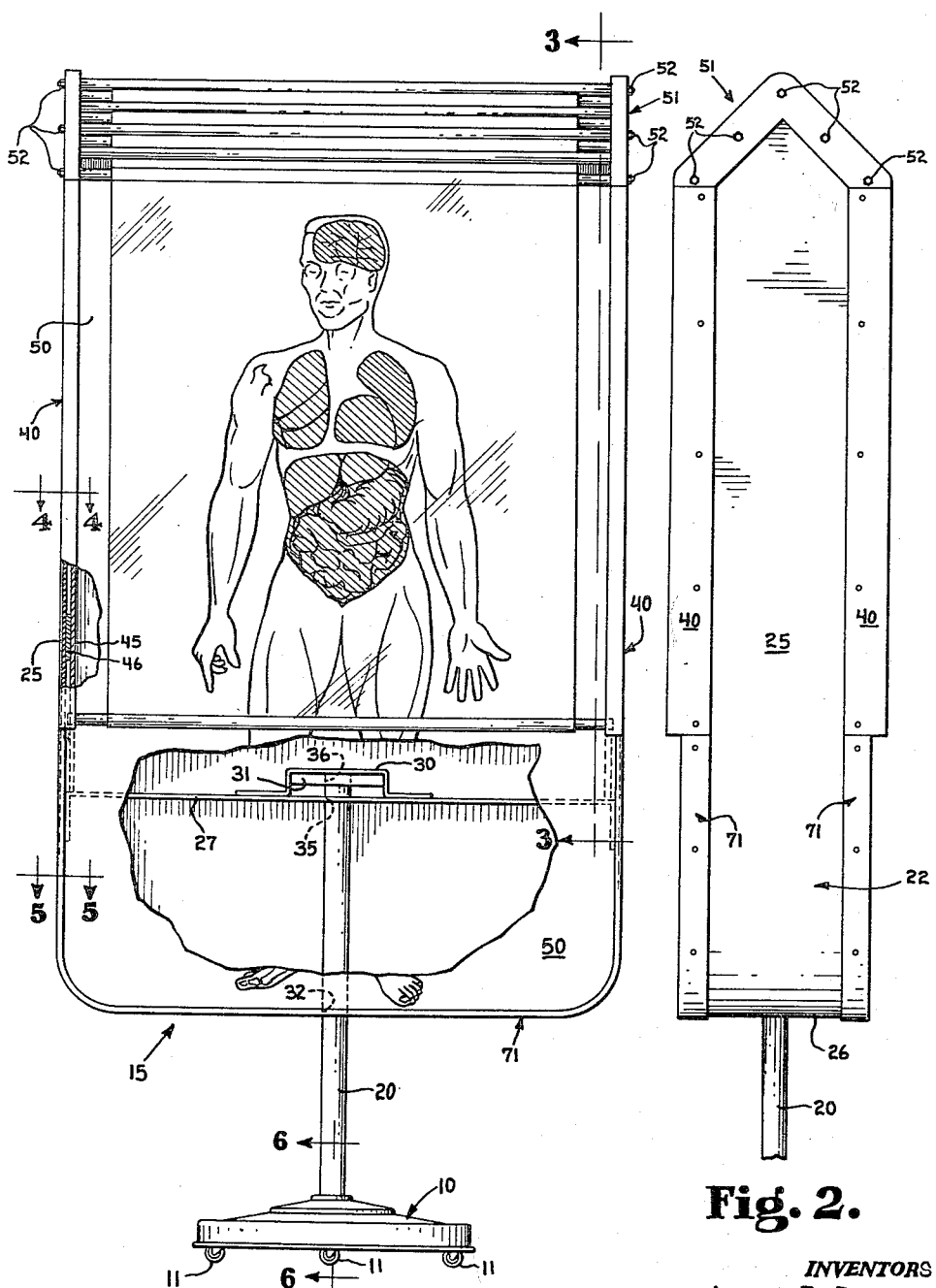

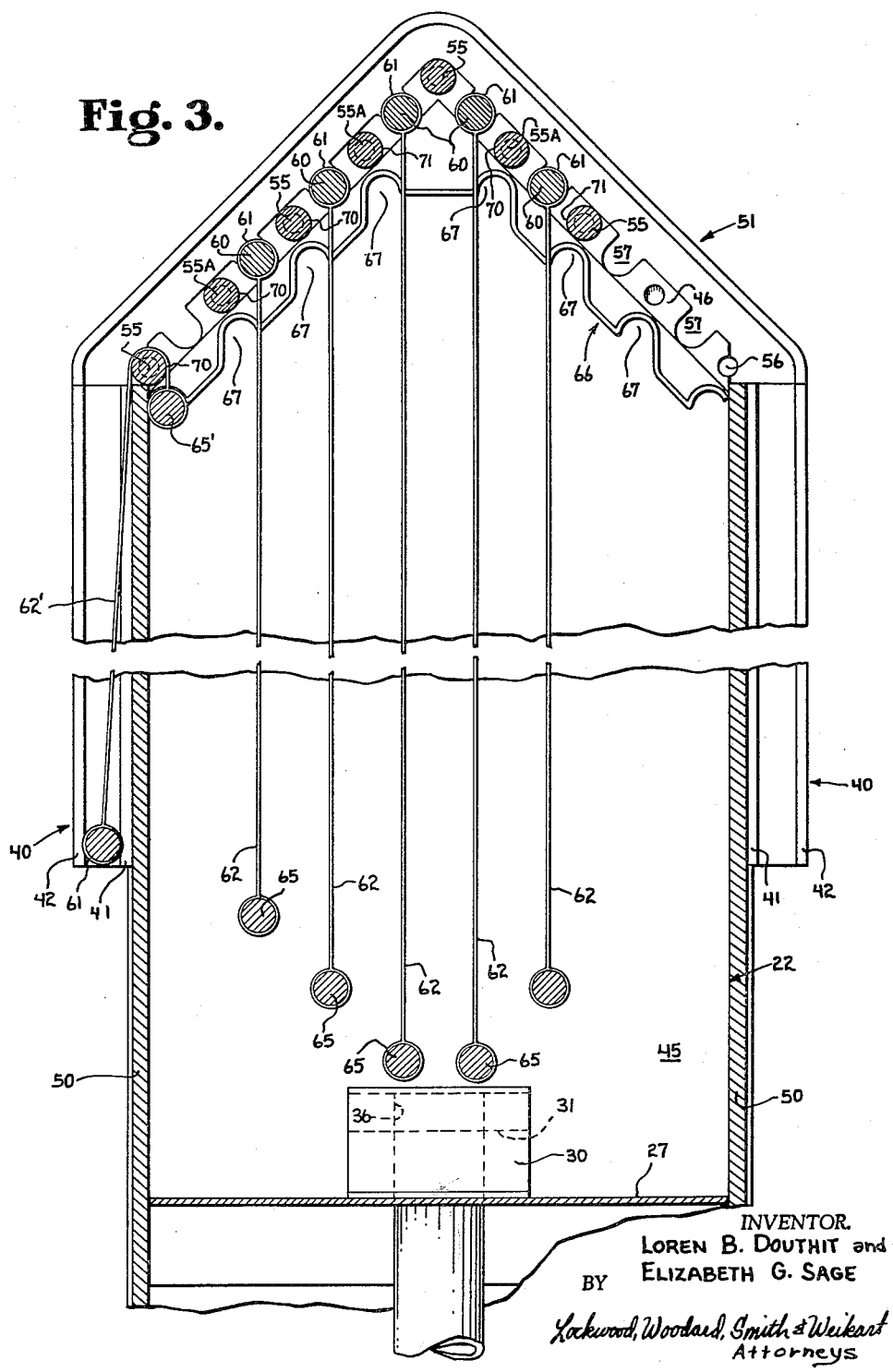

INVENTOR
LOREN B. DOUTHIT and
BY ELIZABETH G. SAGE

Lockwood, Woodard, Smith & Weikart
Attorneys

United States Patent Office 3,171,216
Patented Mar. 2, 1965

3,171,216
EDUCATIONAL DEVICE
Loren B. Douthit and Elizabeth G. Sage, Indianapolis, Ind., assignors to The George F. Cram Company, Inc., Indianapolis, Ind., a corporation of Indiana
Filed Dec. 18, 1961, Ser. No. 159,853
3 Claims. (Cl. 35—17)

The present invention relates to an educational device finding one important utility as a device for demonstrating the progressive depth layers of the human body.

Various devices are presently available for demonstrating the human anatomy. Certain of these devices incorporate various parts which may be removed to show, for example, the muscles, organs and skeletal structure of the body. Such conventional devices are relatively expensive and require disassembly and assembly, always in the same order. In other words, it is impossible, for example, to show the muscles and their location upon the skeleton without first showing the organs between the muscles and the skeleton. Consequently, one object of the present invention is to provide an improved educational device for demonstrating the various progressive depth layers of the human body and whereby selected layers may be demonstrated or displayed without demonstration or display of the layers therebetween.

A further object of the present invention is to provide an educational device whereby any type of informational charts, drawings or the like may be overlapped and placed in registry with one another selectively and in any desired order for the display thereof.

Another object of the present invention is to provide an educational device of the above character which is relatively inexpensive, yet easy to operate but is also durable and long lasting.

Related objects and advantages will become apparent as the description proceeds.

One embodiment of the present invention comprises a member carrying a representation of the basic structure of an object and a plurality of transparent overlays carrying representations of progressive depth layers of the object. Each of the overlays is individually and selectively movable to a position in registry with the representation on the member and there is also provided means for retaining each of the overlays in said registering position.

The full nature of the invention will be understood from the accompanying drawings and the following description and claims.

FIG. 1 is a front elevation with portions thereof broken away of an educational device embodying the present invention.

FIG. 2 is a side elevational of the structure shown in FIG. 1.

FIG. 3 is an enlarged vertical section taken along the line 3—3 of FIG. 1 in the direction of the arrows.

Figure 4:
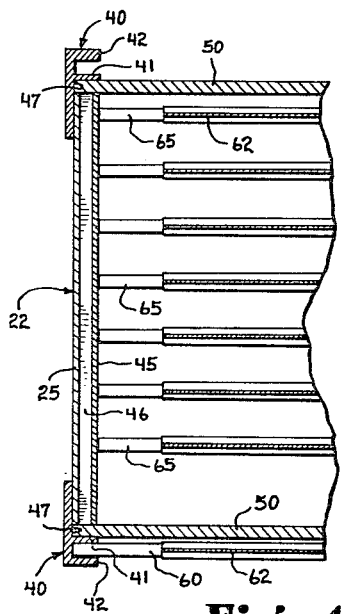
FIG. 4 is an enlarged horizontal section taken along the line 4—4 of FIG. 1 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 6:
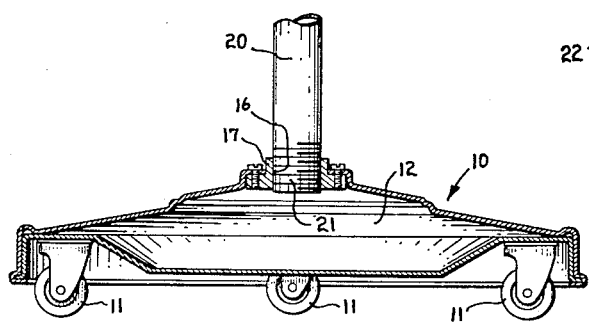
FIG. 6 is an enlarged vertical section taken along the line 6—6 of FIG. 1 in the direction of the arrows.

Referring now more particularly to the drawings, there is illustrated an educational device comprising a base 10 provided with a plurality of rollers 11 rotatably and pivotally mounted thereon whereby the device may be moved from place to place. Referring to FIG. 6, it can been seen that the base 10 has a hollow interior 12 which may be filled with sand, water or the like to provide additional weight in the base preventing tilting of the device by reason of the weight of the upper body or box 15. This water or sand may be placed into the interior 12 through a threaded opening 16 formed in an annular member 17 fixed to the top of the base 10 and also functioning as a mounting means for a post 20 having a threaded lower end 21, the post being fixed to the base by threading within the member 17.

The upper body or box 15 includes an elongated sidewall forming member 22 which is formed into a U-shape and provides the sides 25 and the bottom 26 of the box 15. A brace 27 is fixed to the inner surface of the sides 25 and has mounted thereon a channel member 30 having a block 31 fixed therein. The bottom 26 of the box and the brace 27 have suitable apertures 32 and 35 formed therein through which the post 20 is received for mounting the box upon the base. The block 31 has an aperture 36 formed therethrough but the channel 30 is solid and has no aperture whereby the block and channel assembly provide a bearing recess within which the upper end of the post 20 is received. It will be appreciated that the above structure permits rotation of the box upon the post so that the box can be displayed in any desired direction.

Fixed to the opposite edges of each side 25 are guide members 40. Referring to FIG. 4, it can be seen that each of the guide members has a pair of inwardly projecting flanges 41 and 42. Each side 25 also has fixed thereto an inner wall 45 which is spaced from the side 25 by means of spacer members 46. The flange 41 of each guide member 40 is spaced from its respective side 25 and inner wall 45 a sufficient distance to provide a vertically extending recess 47 for reception of a vertical display board 50, each of which may carry a representation of the basic structure of an object. In the present embodiment, the representation may be a human skeleton.

Figure 7:
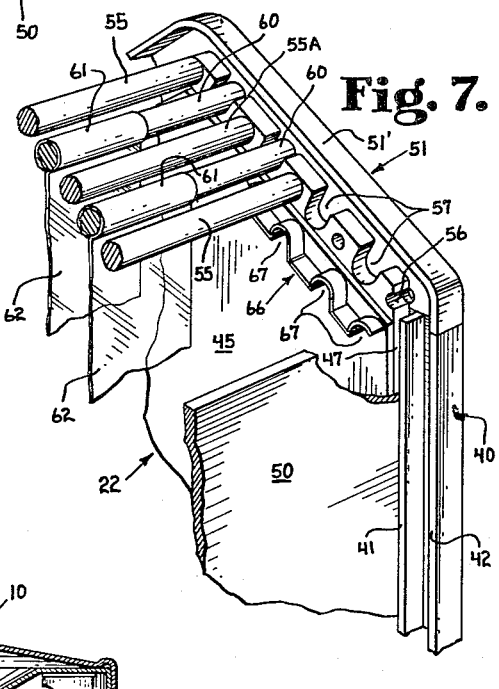
FIG. 7 is a fragmentary perspective view of a portion of the upper end of the structure illustrated in FIG. 1.

Referring to FIG. 1, it will be seen that each display board 50 has a configuration corresponding to the elongated U-shaped member 22, and thus extends completely down to the bootom 26 of the U-shaped member whereby it is supported. Referring to FIG. 7, if it is desired to remove the display boards 50, it is necessary to first remove inverted V-shaped members 51 so that the display board may be slid upwardly along the recesses 47 out of the box 15.

The inverted V-shaped members 51 are fixed to the box by means of bolts 52 (FIG. 2) which are threaded into the opposite ends of rods 55, each of which has necked-down portions (not shown) which extend through apertures 56 in the uppermost spacer members 46 (FIG. 7). This uppermost spacer 46 (one of which is provided on each side of the box) has formed in its upper surface a plurality of upwardly opening recesses 57. Each of the recesses 57 may receive a respective one of rods 60, each of which is connected to one end 61 of a transparent overlay 62 (or 62′) each of which carries a representation of one of the progressive depth layers of the human anatomy. For example, one of the overlays 62 (or 62′) may carry thereon a representation of the muscles while another may carry thereon a representation of the organs beneath the muscles while further such overlays carry further such representations.

Each of the overlays 62 (or 62') has secured to its lower end (as viewed in FIG. 3) a shaft 65 (or 65') which functions when in the position of the majority of overlays in FIG. 3, as a weight straightening out its respective overlay to resist the forming of any wrinkles therein. It will be noted that the shafts 65 (and 65') each have a length slightly less than the distance between the inner walls.

Fixed to the upper inside surface of the inner walls 45 is a pair of elongated members 66 each of which has a plurality of downwardly opening indentations 67 formed therein, each of the indentations being centered directly below the most inward surface 70 of a respective one of the rods 55 or the further rods 55A which are similar to rods 55 but are not fixed to the inverted V-shaped members 51.

Referring to FIG. 3, by grasping of any of the shafts 61 and by raising the shaft upwardly and then pulling the shaft downwardly along the recess formed by the flange 51' on the upper edge of the inverted V-shaped member 51, the respective overlay may be drawn to a position wherein it covers the display board 50 and registers with the display thereon. It will be appreciated that the overlays hung on the left leg of the member 46 (FIG. 3) are intended for use with the leftward board 50 and the overlays hung on the rightward leg for use on the rightward board 50.

The most leftward overlay 62' of FIG. 3 is shown in the above mentioned registering position. It can be seen that because of the position of the downwardly opening recesses 67 centered below the inside surfaces 70, the shafts 65 of the overlays 62 will move directly up into their respective downwardly opening recesses 67 as illustrated in FIG. 3 with respect to overlay 62' and shaft 65'.

The overlays 62 and 62' and the downwardly opening recesses 67 are all suitably proportioned and arranged so that when the shafts 65 or 65' are received in these recesses, the representation carried by the overlay will be in registry with the basic structure of the object (the skeleton) carried by the display board 50. It can be seen that this effect will always be true no matter in what order the overlays are displayed because of the fact that the upwardly opening recesses 57 are located sufficiently downwardly beyond the upper outer surfaces of the rods 55 and 55A so that the longer overlays can extend over the rods 55 and 55A without one or more of the shorter overlay shafts 60 when received in their respective recesses 57 causing the longer overlays to be out of registry.

Figure 5:
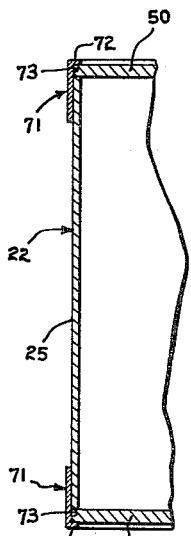
FIG. 5 is an enlarged horizontal section taken along the line 5—5 of FIG. 1 in the direction of the arrows.

Referring to FIG. 5, a section of a lower portion of the box is illustrated as including further guide members 71 which are fixed to the sides 25 of the U-shaped member 22 and which have a similar U-shape but of less height. Each of the guide members 71 has a single inwardly projecting flange 72 which functions to receive the lower end of the display board 50 and to provide with its respective side 25 a recess 73 forming a continuation of the recess 47 and in alignment therewith. Thus, the recess 73 will receive the lower end of the board 50.

From the above description, it will be clear that the present invention provides an educational device whereby selected layers of a progressive depth layer display may be demonstrated or displayed without demonstration or display of the layers therebetween. As illustrated and described herein, the invention has particular utility in the progressive depth display of the human anatomy. However, it will be clear that the present invention also contemplates various types of transparent informational charts which may be overlapped and placed in registry with one another selectively and in any desired order for the display thereof.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An educational device comprising a box including a pair of flat vertical parallel side portions, a top member fixed to the upper edge of each side portion, a plurality of spaced parallel rods fixed at their opposite ends to said top members and fixing said side portions in parallel relation, a front member mounted between said side portions in parallel relation to said parallel rods and carrying a representation of an object, said top members sloping upwardly away from said front member, a plurality of transparent overlays carrying representations of progressive depth layers of the object, a pair of shafts fixed to the opposite ends of each of said plurality of transparent overlays, said top members having a plurality of upwardly opening recesses each positioned between a respective pair of said plurality of rods, stop means including a plurality of downwardly opening recesses each positioned below a respective one of said plurality of rods, each of said overlays being movable between a first position wherein one of said shafts of the overlay is seated in its respective upwardly opening recesses and the other shaft of the overlay and the overlay itself hang downwardly between said side portions and a second position wherein the other shaft of the overlay is seated in its respective downwardly opening recesses and the overlay itself hangs over said front member in registry with the representation of the object carried thereby.

2. An educational device comprising a pair of support members, a plurality of equally spaced parallel rods fixed at their opopsite ends to said support members with their axes defining a plane, a front member in parallel relation to said parallel rods and carrying a representation of an object, a plurality of transparent overlays carrying representations of progressive depth layers of the objects, a pair of shafts fixed to the opposite ends of each of said plurality of transparent overlays, said support members having a plurality of upwardly opening recesses each positioned between a respective pair of said plurality of rods, a pair of stop members each having a plurality of downwardly opening recesses each positioned below a respective one of said plurality of rods, each of said overlays being movable between a first position wherein one of said shafts of the overlay is seated in its respective upwardly opening recesses and the other shaft of the overlay and the overlay itself hang downwardly and a second position wherein the other shaft of the overlay is seated in its respective downwardly opening recesses and the overlay itself hangs over said front member in registry with the representation of the object carried thereby.

3. An educational device comprising a box including a pair of flat vertical parallel side portions, a top member fixed to the upper edge of each side portion, a plurality of equally spaced parallel rods fixed at their opopsite ends to said top members and fixing said side portions in parallel relation, a front member mounted between said side portions in parallel relation to said parallel rods and carrying a representation of an object, a plurality of transparent overlays carrying representations of progressive depth layers of the object, a pair of shafts fixed to the opposite ends of each of said plurality of transparent overlays, said top members having a plurality of upwardly opening recesses each positioned between a respective pair of said plurality of rods, a pair of stop members each having a plurality of downwardly opening recesses each positioned below a respective one of said plurality of rods and each being fixed to one of said side portions, each of said overlays being movable between a first position wherein one of said shafts of the overlay is seated in its respective upwardly opening recesses and the other shaft of the overlay and the overlay itself hang downwardly between said side portions and a second position wherein the other shaft of the overlay is seated in its respective downwardly opening recesses and the overlay itself hangs over said front member in registry with the representation of the object carried thereby.

References Cited in the file of this patent

UNITED STATES PATENTS

| | | |
|---|---|---|
| 221,550 | Grant | Nov. 11, 1879 |
| 396,381 | Yaggy | Jan. 15, 1889 |
| 2,895,233 | Welch | July 21, 1959 |

FOREIGN PATENTS

| | | |
|---|---|---|
| 194,852 | Great Britain | Mar. 22, 1923 |